United States Patent
Holzer

(10) Patent No.: US 8,291,434 B1
(45) Date of Patent: Oct. 16, 2012

(54) COMPUTER SYSTEM AND METHOD TO DISPATCH AND RECEIVE A MESSAGE RESPONSIVE TO THE OCCURRENCE OF AN EVENT

(75) Inventor: David Holzer, San Jose, CA (US)

(73) Assignee: Digi International Inc., Minnetonka, MN (US)

( * ) Notice: Subject to any disclaimer, the term of this patent is extended or adjusted under 35 U.S.C. 154(b) by 1648 days.

(21) Appl. No.: 09/881,248

(22) Filed: Jun. 13, 2001

(51) Int. Cl.
G06F 9/455 (2006.01)
(52) U.S. Cl. ........................................................ 719/318
(58) Field of Classification Search .......... 718/100–102, 718/104; 719/318
See application file for complete search history.

(56) References Cited

U.S. PATENT DOCUMENTS

| | | | | |
|---|---|---|---|---|
| 4,527,270 A | * | 7/1985 | Sweeton | 714/47 |
| 5,475,843 A | * | 12/1995 | Halviatti et al. | 717/124 |
| 5,504,896 A | * | 4/1996 | Schell et al. | 725/131 |
| 5,634,010 A | * | 5/1997 | Ciscon et al. | 709/223 |
| 5,713,045 A | * | 1/1998 | Berdahl | 719/318 |
| 5,717,880 A | * | 2/1998 | Imai et al. | 715/781 |
| 5,838,969 A | * | 11/1998 | Jacklin et al. | 719/318 |
| 6,085,217 A | * | 7/2000 | Ault et al. | 718/105 |
| 6,363,435 B1 | * | 3/2002 | Fernando et al. | 719/318 |
| 6,477,585 B1 | * | 11/2002 | Cohen et al. | 719/318 |
| 6,532,498 B1 | * | 3/2003 | Hager et al. | 719/318 |
| 6,584,491 B1 | * | 6/2003 | Niemi et al. | 709/202 |
| 6,633,313 B1 | * | 10/2003 | Cirne et al. | 715/744 |
| 6,658,487 B1 | * | 12/2003 | Smith | 719/318 |
| 6,829,771 B1 | * | 12/2004 | Bahrs et al. | 719/318 |
| 6,912,718 B1 | * | 6/2005 | Chang et al. | 719/318 |

* cited by examiner

Primary Examiner — Li B Zhen
(74) Attorney, Agent, or Firm — Hemlich Law, PC; Alan Heimlich, Esq.

(57) ABSTRACT

A computing system and method to dispatch and receive messages that are generated responsive to the occurrence of events. The server generates a message when an event such as the clicking of a mouse button occurs. This message can serve as an input for several program modules such as subroutines. A central dispatcher module is programmed with dispatching strategies to dispatch the message to a customized dispatcher module if the message is of a particular kind. The customized dispatcher module is programmed with dispatching strategies to distribute the message to the program modules. The central dispatcher module does not directly interface to the program modules. This allows for the installation and removal of the program modules without reprogramming the central dispatcher module.

22 Claims, 4 Drawing Sheets

COMPUTER SYSTEM AND METHOD TO DISPATCH AND RECEIVE A MESSAGE RESPONSIVE TO THE OCCURRENCE OF AN EVENT

FIELD OF INVENTION

The present invention relates to computers and computer software. Specifically, the present invention pertains to a system and method to dispatch and receive a message responsive to the occurrence of an event.

BACKGROUND OF THE INVENTION

Modern application software is generally event driven. A variety of events occur during the course of running application software. The events can be hardware-generated or software-generated events. Each event belongs to an event type, which is defined by the event source. For example, the event type can be defined as the change in an input/output (I/O) pin voltage level. An event of this event type occurs when the I/O pin changes its voltage level.

When an event occurs, an event message indicating that the event has occurred is generated. The message can be generated by a server such as network server. For the event driven application software, the message can serve as an input for one or more software modules. The software modules can include program subroutines whose code is executed upon receiving the message.

Computing systems have a standard central dispatch mechanism to dispatch the messages to the software modules. A central dispatcher module is generally a subsystem within the server and receives the messages generated by the server. The central dispatcher module is programmed with dispatching strategies to dispatch the messages received from the server. In another words, the central dispatcher module is programmed to dispatch messages for certain kinds of events to certain software modules. For example, the central dispatcher module can be programmed to transmit a message for two kinds of events to a certain subroutine: the messages indicating that a user has clicked the mouse button and the messages indicating that the input output pin voltage level has changed.

The central dispatcher module directly interfaces to the software modules. To install new software modules that subscribe to be notified of the occurrence of specific kinds of events, remove existing software modules, define new events types, or modify the dispatching strategies, the central dispatcher module or the operating system is reprogrammed. The central dispatcher module and the application software is shut down to perform the reprogramming. This presents a problem because frequent reprogramming can result in a high amount of downtime for the application software and the computing system.

SUMMARY OF THE INVENTION

A method for a computing system is disclosed. A first programmable module is created. The first programmable module is programmed to receive a message from a message dispatcher module if the message is generated responsive to the occurrence of an event of a particular kind. A second programmable module is programmed to receive messages from the first programmable module.

BRIEF DESCRIPTION OF THE DRAWINGS

The present invention is illustrated by way of example and not limitation in the figures of the accompanying drawings, in which.

DETAILED DESCRIPTION

Figure 1:
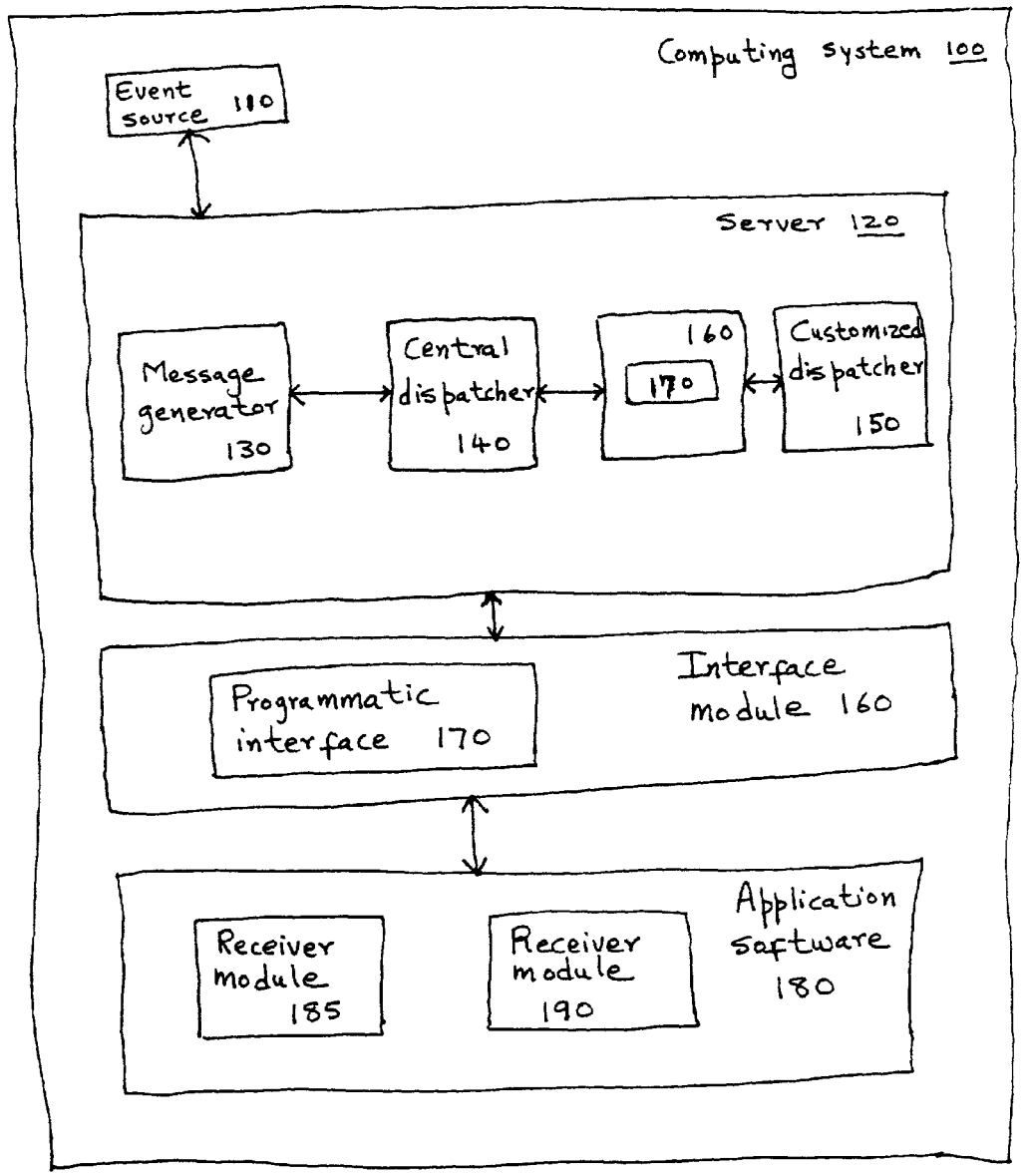
FIG. 1 illustrates an exemplary embodiment of a computer system to dispatch and receive a message responsive to the occurrence of an event.

The present invention discloses a computing system and method to dispatch and receive a message responsive to the occurrence of an event. An event source causes the occurrence of the event. A server generates a message responsive to the occurrence of the event. The message indicates that an event of a particular event type has occurred. The server transmits the message to a central event dispatcher module. The central event dispatcher module can be a subsystem within the server. The central event dispatcher module interfaces to a customized dispatcher module.

The customized dispatcher module is programmed to receive the message from the central dispatcher module if the message was generated responsive to the occurrence of an event of a particular kind. For example, the customized dispatcher module can be programmed to receive a message generated responsive to the occurrence of an event of a particular event type or sub-type. The application that creates the dispatcher module can register the event of the particular kind with the computer system. The customized dispatcher module can register with the central dispatcher module. During the registration process, in one embodiment, the customized dispatcher module can program the central dispatcher module to transmit to it the messages generated responsive to the occurrence of the events of the particular kind. In an alternate embodiment, the central dispatcher module can transmit the messages generated responsive to the occurrence of the events of various kinds to the customized dispatcher module, but the customized dispatcher module can accept only the messages generated responsive to the occurrence of the events of the particular kind.

The customized dispatcher module interfaces to one or more receiver modules. The receiver modules can be installed and removed by the application that installs and removes the customized dispatcher module. Every receiver module can register with the customized dispatcher module. During the registration process, in one embodiment, each receiver module can program the customized dispatcher module to transmit to it the messages received by the customized dispatcher module from the central dispatcher module or a subset of the messages received by the customized dispatcher module. In an alternate embodiment, the customized dispatcher module can transmit the messages it receives from the central dispatcher module to the receiver modules, but each receiver module can accept only a subset of those messages. The receiver modules can be installed and removed without reprogramming the central dispatcher module.

The present invention increases the modularity of the computing system because the customized dispatcher module eliminates the need for a direct interface between the central dispatcher module and the receiver modules. The present invention extends the functionality of the computing system by allowing the receiver modules to be installed while the application software is running because no downtime for the application software is needed to reprogram the central dispatcher module. The present invention extends the flexibility of the computing system because customized dispatcher modules with a variety of message dispatching strategies can be installed. This allows the computing system to uniquely select the receiver modules.

FIG. 1 illustrates an exemplary embodiment of the computer system to dispatch and receive a message responsive to the occurrence of an event. The computing system 100 is shown including the event source 110, the server 120, the message generator module 130, the central dispatcher module 140, the customized dispatcher module 150, interface module 160, the programmatic interface 170, the application 180, and the receiver modules 185 and 190. The event source 110 is coupled to the server 120. The message generator module 130 is coupled to the central dispatcher module 140. The central dispatcher module 140 is coupled to the customized dispatcher module 150 through the interface module 160. The central and customized dispatcher modules 140 and 150 can be programmable modules. The server 120 is coupled to the application 180 through the interface module 160. In one embodiment, the computing system can be a computer network. In another embodiment, the computing system can be a non-network computing system such as a desktop computer.

The event source 110 defines the event type for the events it generates. For example, if event source is a mouse button, the event type is the click of the mouse button. The event can be a user action such as a click of the mouse button or a system occurrence such as running out of memory. It will be appreciated that the event source 110 can be a module within the application software 180. The event source 110 interfaces to the server 120. In one embodiment, the server 120 is a network server. In another embodiment, the server 120 is a non-network server. The server 120 includes the message generator module 130. The message generator module 130 generates a message responsive to the event source 110 generating an event. The message indicates that the event has occurred. The message generator module 130 transmits the message to the central dispatcher module 140 for distribution to the receiver modules 185 and 190. In one embodiment, the central dispatcher module 140 is a subsystem within the server 120. In another embodiment, the central dispatcher module 140 is located outside the server 120.

The central dispatcher module 140 interfaces to the customized dispatcher module 150. The central dispatcher module 140 can interface to the customized dispatcher module 150 through an interface module 160. The interface module 160 can be an application program interface (API). The interface module 160 includes a programmatic interface 170 to call the objects located in the central dispatcher module 140 and request that certain methods be performed on the properties of the objects. For example, the programmatic interface 170 can call the central dispatcher module 140, retrieve the new message, and transmit the new message to the customized dispatcher module 150. In one embodiment, the customized dispatcher module 150 can include a script module to poll the central dispatcher module 140 for new messages. In an alternate embodiment, the central dispatcher module 140 can push the messages it receives from the server 120 to the customized dispatcher module 150. In this embodiment, the customized dispatcher module 150 can be programmed to selectively receive a subset of those messages.

The customized dispatcher module 150 can be a software module that can be installed by the application software 180 by calling the server 120 with a request to execute the function to install the customized dispatcher module 150. The following is an exemplary Java programming language code which when executed calls the server 120 to install the customized dispatcher module.

Dispatcher dispatcher=server.getDispatcher( )
Receiver r=new MessageReceiver( )
Dispatcher customized=new ClassDispatcher(r, MyEventClass.class);
Dispatcher.install(customized);

The central dispatcher module 140 can be programmed with various dispatching strategies. For example, the central dispatcher module can be programmed to dispatch the message to the customized dispatcher module 150 if the event of the event type responsive to whose occurrence the message was generated is an event of a particular event kind. In one embodiment, the event of the event kind includes an event of a particular event type. For example, the customized dispatcher module 150 can be programmed to receive the messages that are generated when a user clicks the mouse button. In another embodiment, the event of the event kind includes an event of a particular class or super class. An example of the message an event class includes a message from a serial port. An example of the message of an event super class includes a message that is a stream of bytes. In still another embodiment, the event of the event kind includes an event for which the message generated responsive to its occurrence is not dispatched to other customized dispatcher modules. In this case, the customized dispatcher module 150 is the default receiver of the message dispatched by the central dispatcher module 140.

The customized dispatcher module 150 interfaces to the receiver modules 185 and 190 through the interface module 160. The programmatic interface 170 can call the customized dispatcher module 150 and retrieve the message. The receiver modules 185 and 190 can be different parts of a program, for example, subroutines. The receiver modules 185 and 190 are programmed to receive the message from the customized dispatcher module 150. It will be appreciated that, similar to the central dispatcher module 140, the customized dispatcher module 150 can be programmed with various dispatching strategies to dispatch the message to the receiver modules 185 and 190. The dispatching strategies can be modified without reprogramming the central dispatcher module 140.

In one embodiment, the receiver modules 185 and 190 include script modules to poll the customized dispatcher module 150 for new messages. The script modules call the programmatic interface 170 with a request to retrieve a new message from the customized dispatcher module 150. The programmatic interface 170 calls the customized dispatcher module 150, retrieves the new message, and transmits the message to the receiver modules 185 and 190. In an alternate embodiment, the customized dispatcher module 150 can push the messages it receives from the central dispatcher module 140 to the receiver modules 185 and 190. In this embodiment, the receiver modules 185 and 190 can be programmed to selectively receive a subset of those messages. The receiver modules 185 and 190 can be software modules that can be installed by the application software 180 by calling the server 120 with a request to install the receiver modules 185 and 190.

Figure 2:
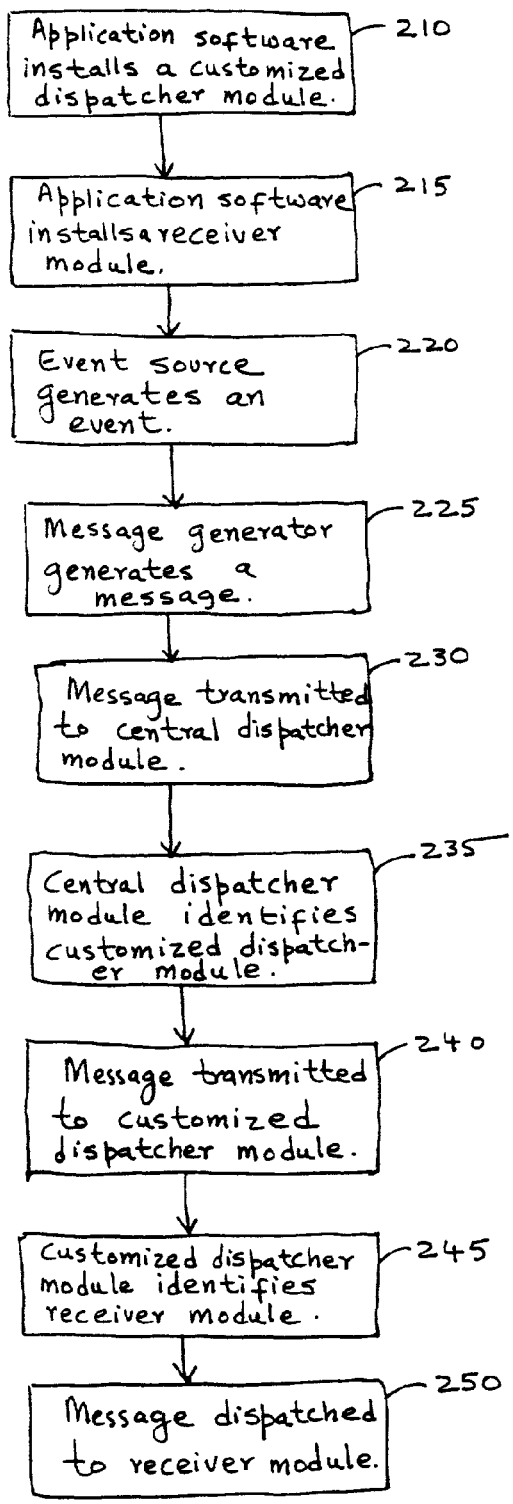
FIG. 2 illustrates an exemplary embodiment of a method to dispatch and receive a message generated responsive to the occurrence of an event.

FIG. 2 illustrates an exemplary embodiment of the method to dispatch and receive a message generated responsive to the occurrence of an event. At block 210, the application software installs a customized dispatcher module. The customized dispatcher module can be programmed to dispatch a message indicating that an event of a specific kind has occurred. At block 215, the application software installs a receiver module. The receiver module is programmed to receive the message dispatched by the customized dispatcher module. At block 220, an event source generates an event of the specific kind. At block 225, responsive to the generation of the event, the message generator module generates a message indicating that the event of the particular event type has occurred. At block 230, the message generator module transmits the message to the central dispatcher module. At block 235, the central dispatcher module identifies the customized dispatcher to be the dispatcher of the message. In another words, the central dispatcher module recognizes that the event of the particular event type is an event of the specific kind the customized dispatcher module is programmed to receive. At block 240, the central dispatcher module transmits the message to the customized dispatcher module. At block 245, the customized dispatcher module identifies the receiver module to be the receiver of the message. At block 250, the customized dispatcher module dispatches the message to the receiver module.

Figure 3:
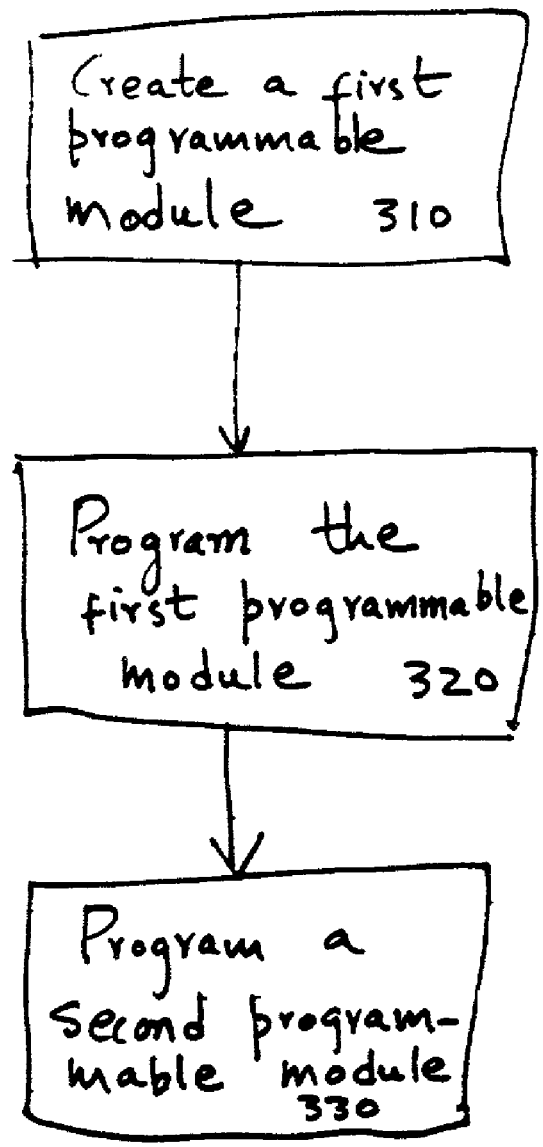
FIG. 3 illustrates another exemplary embodiment of a method to dispatch and receive a message generated responsive to the occurrence of an event.

FIG. 3 illustrates another exemplary embodiment of the method to dispatch and receive a message generated responsive to the occurrence of an event. At block 310, the application software creates a first programmable module. The programmable module can be the customized dispatcher module. At block 320, the application software programs the first programmable module to receive a message from a message dispatcher module if the message is generated responsive to the occurrence of an event of a particular kind. The message dispatcher module can be the central dispatcher module. At block 330, the application software programs a second programmable module to receive messages from the first programmable module. The second programmable module can be the receiver module.

Figure 4:
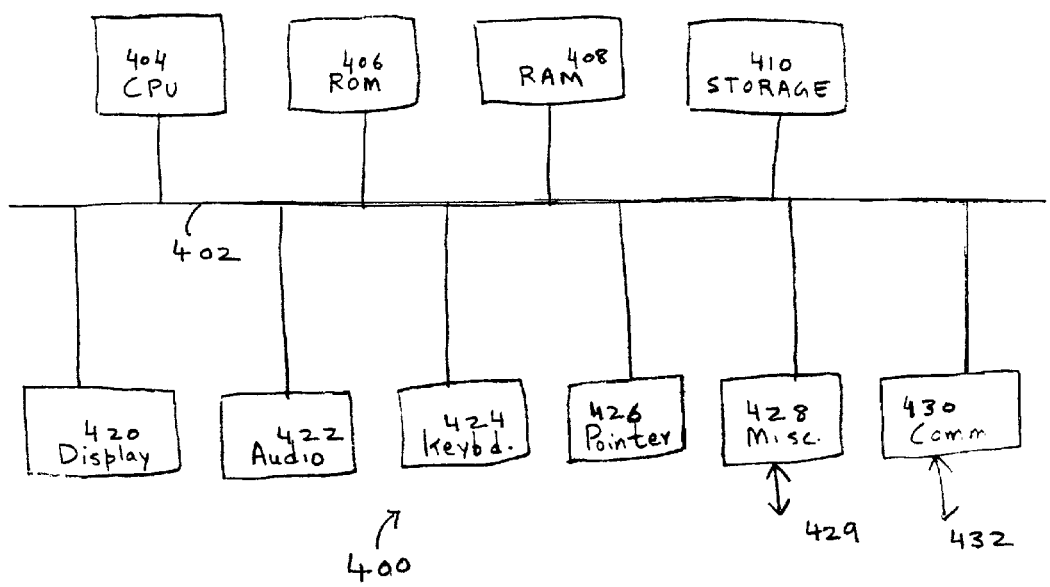
FIG. 4 illustrates an exemplary computer block diagram, which may be representative of the computer system of FIG. 1.

FIG. 4 illustrates an exemplary computer block diagram, which may be representative of the computer system of FIG. 1. The block diagram is a high level conceptual representation and may be implemented in a variety of ways and by various architectures. The computer system 400 includes communications means such as the bus system 402 for communicating information, and a processing means such as a Central Processing Unit (CPU) 404 coupled to the bus 402 for processing information. The bus system 402 may be, for example, one or more of such buses as a system bus, a Peripheral Component Interconnect (PCI), an Advanced Graphics Port (AGP), a Small Computer System Interface (SCSI), and an Institute of Electrical and Electronics Engineers (IEEE) standard number 1394 (Fire Wire). The CPU 404 may be a single, multiple, or even a distributed computing resource.

The computer system 400 includes storage means such as the random access memory (RAM) or other dynamic storage device 408 (referred to as main memory) coupled to the bus 402 for storing information and instructions to be executed by the CPU 404. The main memory 408 also may be used for storing temporary variables or other intermediate information during execution of instructions by the CPU 404. The main memory 408 can be, for example, static, dynamic, synchronous, asynchronous, or any combination. The computer system 400 also includes storage means such as the read only memory (ROM) and/or other static storage device 406 coupled to the bus 402 for storing static information and instructions for the CPU 404. The ROM 406 may be any type of non-volatile memory that may be programmable such as mask programmable and flash. The computer system 400 can also include storage means such as the data storage device 410 coupled to the bus 402. The examples of the data storage device 410 include a Compact Disc (CD), a Digital Versatile Disk (DVD), a hard disk, an optical disk, a tape, a flash, a memory stick or a video recorder.

The storage means 406, 408 and 410 are also referred to as the storage devices. In one embodiment, the main memory 408 includes the application software 180 which when executed by the CPU 404 can create and program the customized dispatcher module 150 and the receiver modules 185 and 190. In another embodiment, the ROM 406 includes the application software 180 which when executed by the CPU 404 can create and program the customized dispatcher module 150 and the receiver modules 185 and 190. In yet another embodiment, the data storage device 410 includes the application software 180 which when executed by the CPU 404 can create and program the customized dispatcher module 150 and the receiver modules 185 and 190.

The computer system 400 can also be coupled via the bus 402 to the display device 420, audio 422, keyboard 424, pointer 426, miscellaneous input/output (I/O) device 428, and communications device 430. The display 420 might be, for example, a Cathode Ray Tube (CRT), a Liquid Crystal Display (LCD), a projection system or a Television (TV). The audio 422 may be, for example, a monophonic, a stereo, or a three dimensional sound card. The keyboard 424 may be, for example, a keyboard, a musical keyboard, a keypad, or a series of switches. The keyboard 424 can include the event source 110. The pointer 426 may be, for example, a mouse, a touch pad, a trackball, or a joystick. The I/O device 428 might be, for example, a voice command input device, a thumbprint input device, a smart card slot, a Personal Computer Card (PC Card) interface, or a virtual reality accessory. The I/O device 428 can be connected via the input/output port 429 to other devices or systems. An example of the miscellaneous I/O device 428 would be a Musical Instrument Digital Interface (MIDI) card with the I/O port 429 connected to the musical instrument(s). The I/O device can be connected to the event source 110. The communications device 430 might be, for example, an Ethernet adapter for a local area network (LAN) connection, a satellite connection, a set-top box adapter, a Digital Subscriber Line (xDSL) adapter, a wireless modem, a conventional telephone modem, a direct telephone connection, a Hybrid-Fiber Coax (HFC) connection, or a cable modem. The external connection port 432 may provide for any interconnection, as needed, between a remote device and the bus system 402 through the communications device 430. For example, the communications device 430 might be an IEEE 802.3 (Ethernet) adapter that is connected via the connection port 432 to, for example, an external DSL modem. The connection port 432 can be connected to the event source 110.

These and other embodiments of the present invention may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

In addition, the instructions to perform the methods as described above could alternatively be stored on other forms of computer-readable mediums. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals and digital signals).

What is claimed is:

1. A method for a computing system, comprising:
creating a first programmable module;
creating a customized message dispatcher module, wherein the customized message dispatcher module is not a central dispatcher module;
programming the first programmable module to receive a message only from the customized message dispatcher module if the message is generated responsive to the occurrence of an event of a particular kind; and
programming a second programmable module to receive messages directly from the first programmable module, the messages being stored in hardware on the computing system and being displayed to a user.

2. The method of claim 1, wherein the first programmable module being created by using an application.

3. The method of claim 1, further comprising creating and removing the second programmable module by using an application.

4. The method of claim 1, further comprising creating and removing the second programmable module without reprogramming the customized message dispatcher module.

5. The method of claim 1, wherein programming the second programmable module includes programming the second programmable module to receive a subset of messages received by the first programmable module from the customized message dispatcher module.

6. A storage device having stored thereon a set of instructions, which when executed by a processor, cause the processor to perform the following comprising:
creating a first programmable module;
creating a customized message dispatcher module, wherein the customized message dispatcher module is not a central dispatcher module;
programming the first programmable module to receive a message only from the customized message dispatcher module if the message is generated responsive to the occurrence of an event of a particular kind; and
programming a second programmable module to receive messages directly from the first programmable module, the messages a being stored on the storage device and being displayed to a user.

7. The storage device of claim 6, wherein the first programmable module being created by using an application.

8. The storage device of claim 6, further comprising creating and removing the second programmable module by using an application.

9. The storage device of claim 6, further comprising creating and removing the second programmable module without reprogramming the customized message dispatcher module.

10. The storage device of claim 6, wherein programming the second programmable module includes programming the second programmable module to receive a subset of messages received by the first programmable module from the customized message dispatcher module.

11. An apparatus comprising:
a message dispatcher module;
a storage device having stored therein an application;
a processor coupled to the storage device to execute the application;
the processor to create a first programmable module, to create a customized message dispatcher module, wherein the customized message dispatcher module is not a central dispatcher module, and program the first programmable module to receive a message only from the customized message dispatcher module if the message is generated responsive to the occurrence of an event of a particular kind; and
the processor to program a second programmable module to directly receive messages from the first programmable module, the messages being stored in hardware on the computing system and being displayed to a user.

12. The apparatus of claim 11, wherein the processor creates and removes the second programmable module without reprogramming the customized message dispatcher module.

13. The apparatus of claim 11, wherein the processor programs the second programmable module to receive a subset of messages received by the first programmable module from the customized message dispatcher module.

14. The apparatus of claim 11, further comprising an event source to generate the event.

15. The apparatus of claim 14, wherein the event source includes a keyboard.

16. The apparatus of claim 14, wherein the event source includes a communications device.

17. The apparatus of claim 11, further comprising a message generator to generate the message responsive to the occurrence of the event.

18. A computing system having a computer-readable medium storage device having stored thereon a set of instructions which when executed by a processor, cause the processor to perform the following comprising:
means for creating a first programmable module;
means for creating a customized message dispatcher module, wherein the customized message dispatcher module is not a central dispatcher module;
means for programming the first programmable module to receive a message only from a message dispatcher module if the message is generated responsive to the occurrence of an event of a particular kind; and
means for programming a second programmable module to directly receive messages from the first programmable module, said messages being stored in hardware on said computing system and being displayed to a user.

19. The computing system of claim 18, wherein the means create and remove the second programmable module without reprogramming the customized message dispatcher module.

20. The computing system of claim 18, wherein the means program the second programmable module to receive a subset of messages received by the first programmable module from the message dispatcher module.

21. The computing system of claim 18, further comprising means for generating the event.

22. The computing system of claim 18, further comprising means for generating the message responsive to the occurrence of the event.

* * * * *